US005142511A

United States Patent [19]

Kanai et al.

[11] Patent Number: 5,142,511

[45] Date of Patent: Aug. 25, 1992

[54] PIEZOELECTRIC TRANSDUCER

[75] Inventors: Harumi Kanai; Yoshiaki Tanaka; Kazuyasu Hikita, all of Saitama, Japan

[73] Assignee: Mitsubishi Mining & Cement Co., Ltd., Tokyo, Japan

[21] Appl. No.: 709,798

[22] Filed: Jun. 3, 1991

Related U.S. Application Data

[63] Continuation of Ser. No. 499,587, Mar. 27, 1990, abandoned, which is a continuation-in-part of Ser. No. 487,896, Mar. 6, 1990, abandoned.

[30] Foreign Application Priority Data

Mar. 27, 1989 [JP] Japan ................................ 1-76294

[51] Int. Cl.[5] ........................................ H04B 17/00

[52] U.S. Cl. ................................ 367/164; 310/358

[58] Field of Search ............... 367/150, 152, 157, 162, 367/164; 310/326, 335, 337, 365, 366, 358; 128/24 A, 660.03, 804; 501/80-83

[56] References Cited

U.S. PATENT DOCUMENTS

| | | | |
|---|---|---|---|
| 4,330,593 | 5/1982 | Shrout et al. | 310/358 X |
| 4,686,409 | 8/1987 | Kaarman et al. | 310/358 |
| 4,725,989 | 2/1988 | Granz et al. | 367/150 X |
| 4,777,153 | 10/1988 | Sonuparlak et al. | 310/337 X |
| 4,900,972 | 2/1990 | Wersing et al. | 310/800 X |
| 4,914,565 | 4/1990 | Schnoeller et al. | 310/164 |

*Primary Examiner*—Brian S. Steinberger

*Attorney, Agent, or Firm*—Cushman, Darby & Cushman

[57] ABSTRACT

A piezoelectric transducer having electrodes formed on both surfaces has a piezoelectric base molded as a curved plate which can converge sound fields of acoustic waves at an arbitrary point and which can reduce noise or reverberation in a lateral direction which otherwise occur due to unnecessary vibration. At least one of the electrodes is divided concentrically. A material having a small electromechanical coupling factor $K_p$ in the lateral direction is used for the piezoelectric material, preferably porous PZT.

20 Claims, 7 Drawing Sheets

REFERENCE

EMBODIMENT

PIEZOELECTRIC TRANSDUCER

This is a continuation of application Ser. No. 07/499,587, filed on Mar. 27, 1990,which was abandoned upon the filing hereof which is a continuation in part of U.S. application Ser. No. 07/487,896, filed Mar. 6, 1990 by Hikita et al., (the same inventors as the present case) entitled "Piezoelectric Transducer" and now abandoned.

FIELD OF THE INVENTION

This invention relates to a piezoelectric transducer which converts electric signals into sound waves or other mechanical vibrations, or converts mechanical vibrations into electric signals. This invention is applicable to sound radiation, focusing, transmission and receiving. This invention is suitable for use in transmission/reception of sound waves into/from water and/or the human body, and more particularly as a probe in an ultrasonic diagnostic apparatus.

BACKGROUND OF THE INVENTION

Piezoelectric transducers have conventionally been used to convert electric signals into sound waves or other mechanical vibrations or to convert mechanical vibrations into electric signals. They convert electric signals into mechanical vibrations by using the morphological change of a crystal by voltage application. Conversely they can use the voltage generated by a pressure applied on a crystal to determine the amount of the pressure.

One application of a piezoelectric transducer is as a probe which is well known for use in an ultrasonic diagnostic equipment for medical purposes or in a nondestructive test unit for materials. For instance, the scanning method of ultrasonic beams, the principle of linear electronic scanning, sector electronic scanning, and the principle of beam deflection are described in a paper entitled "Recent progress in ultrasonic diagnostic apparatuses"; the Journal of Acoustic Society of Japan, Vol. 36, No. 11, 1980, pp. 576–580. The paper also explains how to obtain ultrasonic images for medical uses.

However, the resolution of piezoelectric transducers currently used as a probe is not yet quite satisfactory.

In order to enhance the image resolution in a diagnostic apparatus, it is necessary to improve the positional precision, the time-resolution, and matching in acoustic impedance with a sample.

In order to improve the positional precision, it is desirable to converge ultrasonic beams at a point. The probe which has been used in the linear scanning method of the prior art was defective in that it linearly focuses ultrasonic beams. The sound source should preferably be a curved surface, or more particularly a spherical surface, in order to focus ultrasonic beams at a point.

This applicant has already filed a patent application for a piezoelectric transducer having a curved sound source. (JPA laid-open Sho 60-111600 which is hereinafter referred to as the first application). An embodiment wherein piezoelectric transducer elements having curved surfaces are formed on a curved base is described in the specification and drawings of the first application, and convergence and radiation of acoustic waves are explained. However, the piezoelectric transducer according to this application was not intended to be used as a probe and therefore the invention did not consider the control of beam focus point.

The convergence point of radiated beams could be controlled by the piezoelectric transducer disclosed in the first application if plural piezoelectric transducer elements are formed as concentric annular electrodes, and driving pulses applied to each of the electrodes are staggered timewise. However, the invention mentioned above is still defective because of the following point in time resolution.

In order to improve time-resolution, the reverberation of received waves should be reduced and the time required for damping should be shortened. However if plural electrodes are provided on a dense piezoelectric material, the effect of driving an electrode, especially with a vibration or electric field, would be propagated to other electrodes. A probe emits acoustic waves excited by electric driving pulses toward a target (e.g. the living body), receives the acoustic waves reflected therefrom, and converts them into electric signals again, using a single device for all the above actions. Therefore, if vibration or voltage leaks to other elements, the state is the same as if ultrasonic signals are inputted from outside and this can cause noise and inaccuracy.

As a means to solve the problem, it is proposed to divide the piezoelectric material in addition to the electrodes. The present applicants have filed a patent application for a piezoelectric transducer wherein both piezoelectric material and electrodes are divided and arranged concentrically to improve positional precision as well as time resolution. (Inventors Hikita et al., U.S. Ser. No. 07/487,896 filed on Mar. 6, 1989. Hereinafter referred to as the second application). However, this application did not consider the matching of acoustic impedance.

When mismatching exists in acoustic impedance between the piezoelectric material and a living body or water, the sound generated from the piezoelectric transducer is greatly damped when reflected from a target. When the amount of damping is large, the sensitivity in received signals deteriorates, presenting a difficulty in obtaining clear images. Therefore, the acoustic impedance of a piezoelectric transducer should preferably be close to that of the water when used as a probe in an ultrasonic diagnostic apparatus.

This invention was conceived to solve the above mentioned problems in the prior art, and aims to provide a piezoelectric transducer which can prevent deterioration of resolution which would otherwise be caused by noise or reverberations due to transmission of vibrations between adjacent piezoelectric transducer elements and which has an acoustic impedance closer to that of water.

SUMMARY OF THE INVENTION

The piezoelectric transducer according to this invention has electrodes formed on both surfaces of a disc shaped piezoelectric base which is formed with curved surfaces, and the electrode formed on at least one surface thereof is divided concentrically with the divided parts being insulated from each other. The piezoelectric transducer of this invention is characterized in that it is formed with a material having an electromechanical coupling factor $K_p$ for vibration in the surface direction of said disc piezoelectric base of 0.3 or less. (Herein referred to as spreading vibration mode or radial mode vibration.)

The piezoelectric base is preferably made of a material having a mechanical quality factor $Q_m$ of 30 or less. The material may be lead zirconate titanate having a porosity of 30 vol% or higher. It may be barium titanate, a compound of a lead titanate group, or a compound of a lead zirconate titanate group or a mixture thereof which has a porosity of 30 vol% or higher. Polyvinylidene fluoride or a copolymer thereof may be used as a material having a low mechanical quality factor $Q_m$.

The piezoelectric base should preferably be processed to have a spherical surface. The thickness of the piezoelectric base is preferably 1 mm or less, or more preferably 0.7 mm or less, in order to generate or receive ultrasonic waves of several MHz.

The center divided electrode is preferably circular while the surrounding electrodes are annular and concentric. Alternately, all the divided electrodes may be annular. Alternatively, circular or annular electrodes may be, for instance, radially divided. The electrode opposed to the divided electrodes is preferably formed substantially throughout the surface of the piezoelectric base.

Electrostatic capacities between the first and second electrodes, which are opposed across the base, should preferably be substantially equal to each other.

For convenience in use, the piezoelectric transducer is desirably covered with a resin coating on the surface and end faces thereof.

As the mechanical coupling factor $K_p$ in the spreading vibration mode of the piezoelectric base is small, it is possible to reduce the mechanical stress or vibration transmitted to adjacent regions Therefore, in the case where plural electrodes are driven independently, the signal voltage which drives adjacent electrodes has less effect, so that sound fields can be converged or radiated with a higher precision.

Porous piezoelectric ceramics are suitable as a material having a small mechanical coupling factor $K_p$. Those ceramics have a small mechanical quality factor $Q_m$ and can damp received vibration quickly, to thereby provide an acoustic impedance closer to that of water. The materials therefore can reduce damping of acoustic waves which are outputted from a piezoelectric transducer and reduce damping of acoustic waves which are reflected or propagated in water or in living tissue.

The convergence of the sound fields will now be described. As shown in the first application, a curved piezoelectric transducer acts as an acoustic lens which converges sound fields on its concave surface while a spherical piezoelectric transducer converges sound fields at its spherical center. When the electrode is divided concentrically and driven by electrodes of the same phase, the sound fields are converged similarly at the spherical center.

If concentrically arranged electrodes are driven staggered timewise from the outermost one, mechanical vibrations, especially acoustic waves, can be focused at an arbitrary point depending on the driving timing.

The sound fields which converge at a point will be referred to as a converged sound field herein.

A converged sound field may be obtained if annular concentric electrodes are formed on a piezoelectric base made of a dense material and driven sequentially from the outside. However, when an electrode is electrically driven, mechanical stress, vibration and an electric field are inevitably transmitted to an adjacent element via the piezoelectric material. Acoustic waves and vibrations are generated from the adjacent element to lower the convergent property of the sound field as well as to cause noise. This problem is solved by using a material of small mechanical coupling factor $K_p$.

If the piezoelectric transducer is formed in a curved or a spherical form, the sound fields can be converged or radiated with a higher precision.

Adjustment in impedance between both electrodes becomes easier, and hence the distribution of input power of electrodes becomes simpler by making the electrostatic capacities equal between opposing electrodes.

Insulation between electrodes can be enhanced by covering the surfaces and end faces with a resin coating to thereby increase environmental resistance. By using the resin coating as a backing layer, unnecessary sound or vibration can be absorbed to thereby reduce influence of the sound fields. By using the coating as a matching layer for the acoustic impedance, damping of acoustic waves which is otherwise caused by the reflection on the interfaces between the device and the water or the living tissues at the time of transmission or receiving of waves can be reduced, to thereby increase sensitivity.

As the piezoelectric transducer according to this invention has a small electromechanical coupling factor $K_p$ in the spreading mode of the planar direction of the base, interference between electrodes can be avoided to diminish noise.

This also means that the received waves can be damped quickly, and a subsequent pulse can be generated in a short time. A high time resolution and a high distance resolution may be provided conveniently in an ultrasonic diagnostic apparatus or a material testing system.

When a porous material is used, acoustic impedance could be reduced to be closer to that of the living tissues or water to thereby decrease damping in acoustic waves which would otherwise be caused due to mismatching of acoustic impedances.

When a spherical material is used for the base, it can focus sound fields on the concave side and is highly applicable to be an acoustic lens. The convergent point is controlled arbitrarily by staggering phases of driving voltages which are applied to the concentric annular electrode.

Coating the surfaces and the end faces with a resin film enhances the reliability of the device, and if used as a matching layer for sound, the coating can also decrease damping of the sound. Further, if the coating is provided as a backing layer on the surface opposite to the one generating acoustic waves, it can decrease noise. If both surfaces of the device are formed to have a matching layer and a backing layer respectively, a greater effect can be expected.

The piezoelectric transducer according to this invention can generate mechanical vibrations, especially acoustic waves which can be converged substantially at a point, and control such convergent points. As the device is highly resistant to noise, it can be used as a probe for ultrasonic diagnostic equipment to obtain images at an excellent positional precision. It can be used as a speaker which is can be installed at an arbitrary location and which can converge sound fields at a specific position.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
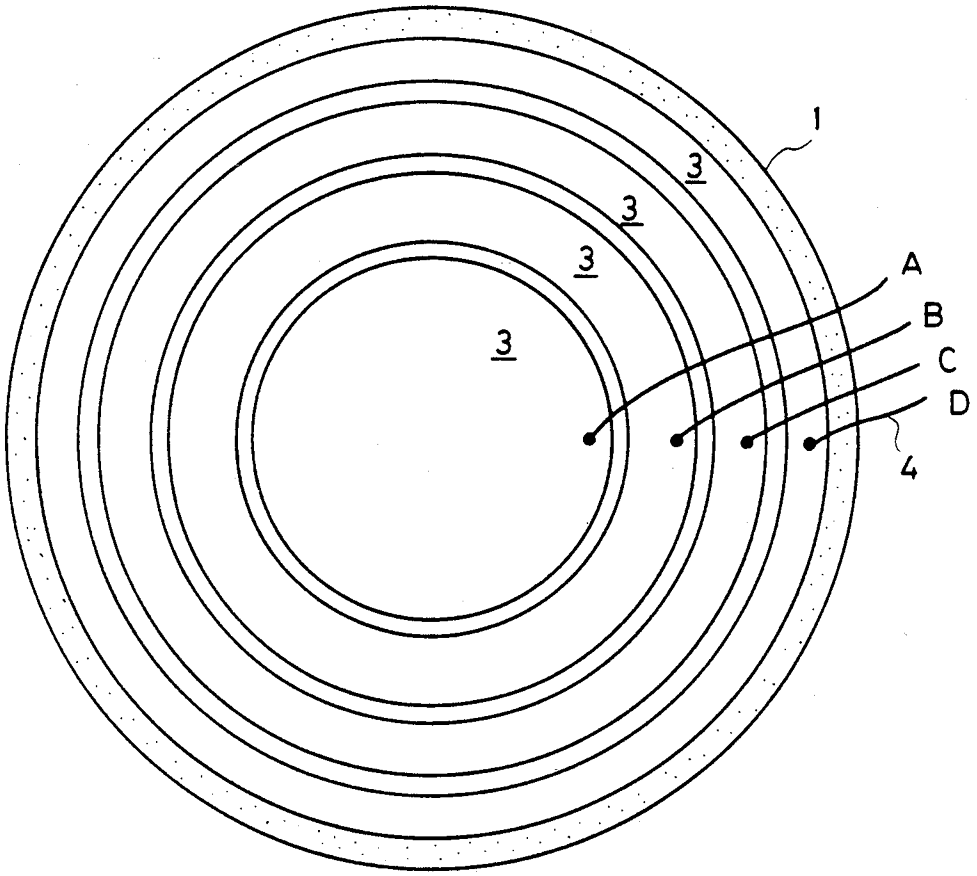
FIG. 1 is a top view of the first embodiment of the piezoelectric transducer of this invention.
Figure 2:
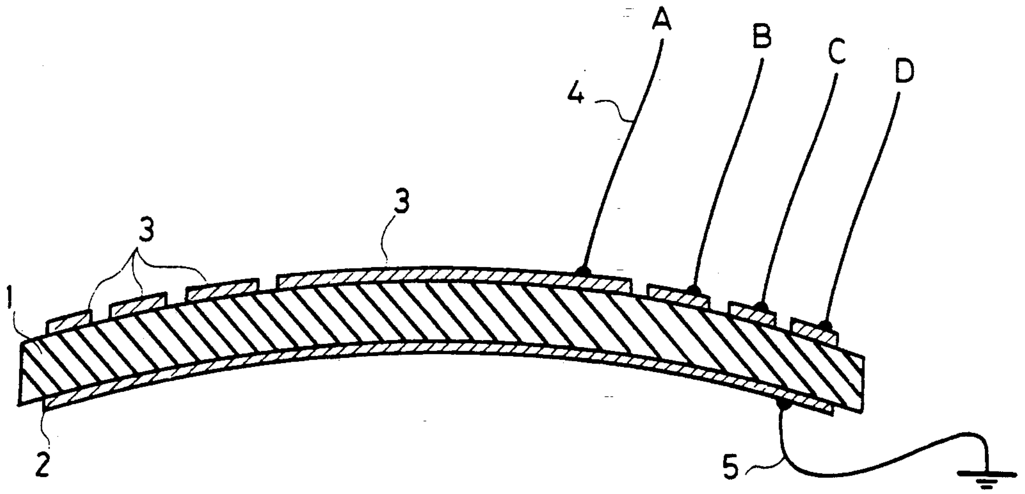
FIG. 2 is a sectional view of the first embodiment.

FIGS. 1 and 2 show the first embodiment of the piezoelectric transducer according to this invention; namely FIG. 1 shows its top view while FIG. 2 shows its sectional view along the line 2—2' of FIG. 1.

The piezoelectric transducer comprises a piezoelectric base 1 which is molded in a curved plane, a first electrode 2 formed on a surface of the piezoelectric base 1, and a second electrode 3 formed on the other surface of the piezoelectric base 1. At least one of the first and second electrodes 2 and 3 (in this embodiment the second electrode 3) is divided concentrically in a manner to have sections which are insulated from each other.

The piezoelectric base 1 is made of a material having a electromechanical coupling factor $K_p$ of 0.3 or less and a mechanical quality factor $Q_m$ of 30 or less. The preferred material is lead zirconate titanate (referred to as PZT) having porosity of 30 vol% or higher.

The piezoelectric base 1 is formed as a sec-tion of a spherical shape. The second electrodes 3 include a dome-shaped electrode (either flat or rounded in form) and plural concentric annular electrodes (in this embodiment there are three). The first electrode 2 is formed substantially over the whole surface of the piezoelectric base 1. The second electrodes 3 are formed in a manner to have electrostatic capacities which are substantially equal to each other.

The manufacturing method of the device will now be described.

Powders of PbZrO, and of $PbTiO_3$, having a grain size of 40 μm or less, and preferably of 20 μm or less, are separately calcined and mixed at the molecular ratio of 53:47. A solvent for molding (mainly xylene or ethanol) and a binder (PVD) are added to the mixture to form a slurry, and green sheets are prepared using a doctor blade. The green sheet is cut into a round shape and formed to a spherical form. The piece is fired at 1000°-1200° C., and the obtained porous PZT is used as the piezoelectric base 1. The base has a thickness of 0.2 mm, porosity of 50%, K of 0.12, and $Q_m$ of 11.

The thickness of the piezoelectric base 1 is preferably 1 mm or less, and more preferably 0.7 mm or less, in order to operate with a frequency of several MHz. In this embodiment, the thickness was determined to be 0.2 mm, and the resonant frequency in the direction of the thickness is about 3 MHz. For a higher frequency, the thickness needs to be decreased. However, since the base is made of a porous material, if it becomes too thin, the strength becomes too low to be practical.

In the above process, an expansion due to the reaction of $PbZrO_3$ with $PbTiO_3$ is used to obtain porous PZT. The porosity of PZT may be adjusted by selecting a suitable condition for particle size, substances to be added to the slurry, the baking temperature, etc. to be 30 vol% or higher. The details of porosity of lead zirconate titanate are taught in Hikita, K. et al; "Effect of porous structure to piezoelectric properties of PZT ceramics" Japanese J. Appl. Phys. 22, Supplement 22-2, pp. 64–66, (1983).

The first electrode is formed on the concave surface of the piezoelectric base 2, and the second electrodes 3 on the convex surface thereof. More particularly, silver electrodes are baked onto the concave and convex surfaces of the base 1, and the electrode on the convex side is etched concentrically so as to form one circular electrode and plural concentric annular electrodes. The outer peripheral edge of the base is not provided with any electrode, so as to ensure electrical insulation between the concave and convex surfaces. The electrode 3 is divided in a manner to make the areas of the respective electrodes substantially equal to each other and electrostatic capacities of the first and each of the second electrodes opposing to each other across the base 1 substantially identical.

The dimensions of the second electrodes are:

(1) The outer diameter of the central dome-shaped: 10.4 mm (2) The inner and outer diameters of an annular electrode adjacent to the central electrode: 11.4 mm and 15.4 mm respectively (3) The inner and outer diameters of the annular electrode adjacent to the above: 16.4 mm and 19.4 mm respectively (4) The inner and outer diameters of the annular electrode adjacent to the above: 20.4 mm and 23.0 mm respectively The device is then processed for polarization. More specifically, the first electrode 2 is grounded and the second electrodes 3 are connected to a positive terminal of a power source. The device 1 is immersed in silicone oil at 120° C., and has an electric field of 2-3 kV per 1 mm applied to it for 20-30 minutes to polarize the structure. After the above treatment is completed, the device is taken out of the oil, washed with ethanol, and dried. The first and second electrodes are soldered to leads 4 and 5.

Figure 3:
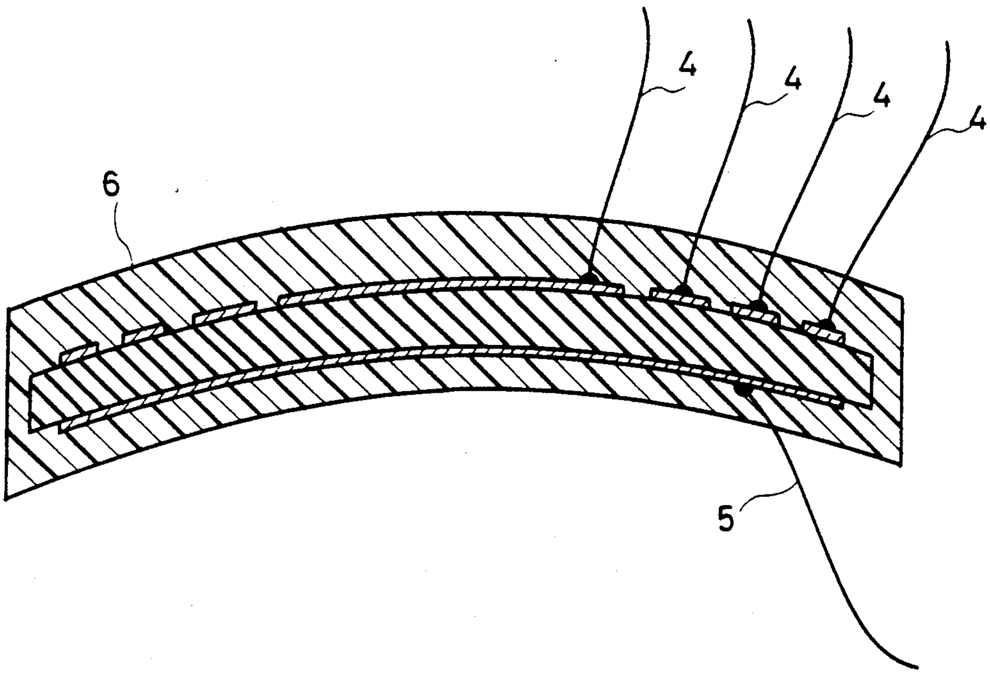
FIG. 3 is a sectional view of the second embodiment of the piezoelectric transducer of this invention.

FIG. 3 shows the second embodiment of this invention in section. The second embodiment differs from the first embodiment in that the surfaces and the end faces are coated with a resin film 6.

In order to coat the surfaces with a resin film 6, a resin film of urethane or the like, which has been molded in advance, is attached to both surfaces of the device and resin 13 also applied on the end faces. All the surfaces may be coated by resin. By coating the end faces with resin, the water-tightness can be enhanced to effectively increase reliability.

The resin film 6 may be used as a backing layer to absorb unnecessary sound or vibration in the direction toward the convex surface. Another baking layer may be attached upon the resin film 6.

The effect of mechanical vibrations and electric signals to adjacent electrodes and the convergent effect of sound fields and characteristics of transmitted/received waves were measured using the thus-obtained piezoelectric transducer. A device with the same structure, but using a dense substance of PZT, instead of porous PZT used for the embodiment, was measured as a comparison.

Test 1

Figure 4:
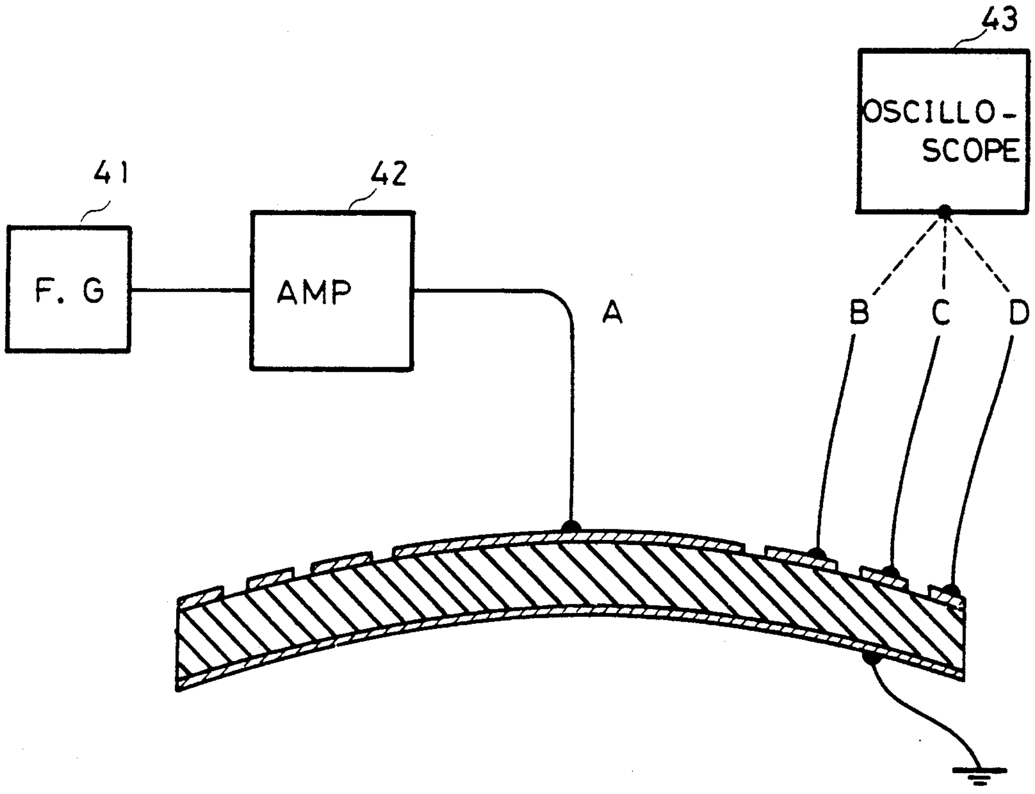
FIG. 4 is a chart to show the result of the test measuring the effect of mechanical vibrations and electric signals to adjacent electrodes.

FIG. 4 shows the test method used to measure the effect of mechanical vibrations and electric signals to adjacent electrodes.

In the test, the center one of the second electrodes 3 was denoted as A, and surrounding electrodes were denoted sequentially as B, C and D. The sine wave amplitudes generated on the electrodes B, C and D were measured when the electrode A was driven by applying an AC sine wave of 10 V at 3 MHz.

The sine wave applied on the electrode A was generated by a function generator 41 and amplified by an amplifier 42. The amplitudes of sine waves generated at the electrodes B, C and D were measured by an oscilloscope 43.

Figure 5:
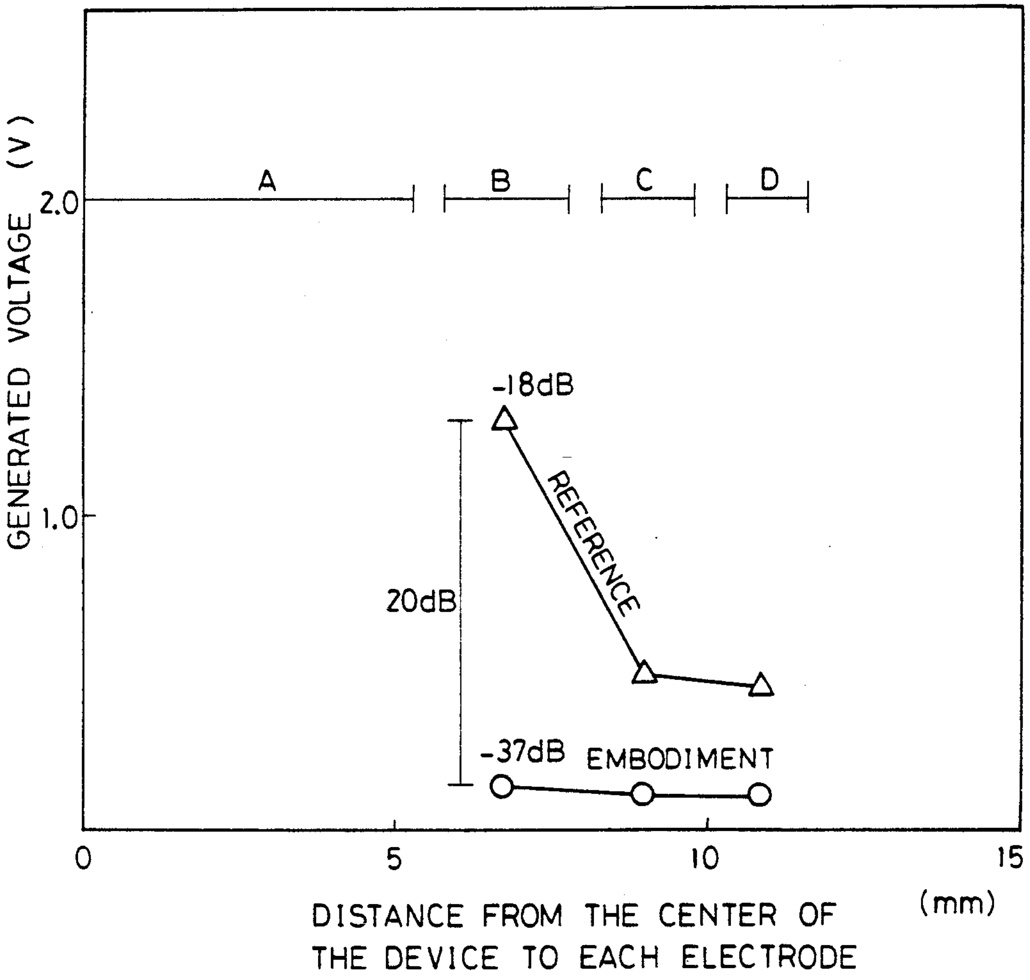
FIG. 5 is a chart to show the result of the test.

The chart in FIG. 5 shows the result of the measurement on the first embodiment and the comparative sample. The porous PZT had a porosity of 50% and a electromechanical coupling factor $K_p$ of 0.12.

In the case of a comparative sample using dense PZT, signals generated on the electrode B adjacent to the central electrode A had an amplitude lower than that applied to the electrode A by 18 dB. In the embodiment using porous PZT, the amplitude of the generated signals was as low as 37 dB attenuated from that applied on the electrode A, showing the difference of 19 dB from the comparative sample. At the electrode C, the difference in amplitude from that applied on the electrode A was 26 dB in the comparative sample, and 38 dB in the embodiment. At the electrode D, the difference was 27 dB in the comparative sample and 38 dB in this embodiment.

As described above, this test verifies that, at all the electrodes, the device using porous PZT is less susceptible to the effect of mechanical vibrations and electric signals to adjacent electrodes.

A similar test was conducted on the second embodiment and a comparative sample of the same structure. The difference at the electrode B was about 19 dB between the two samples. A similar result as that of the first embodiment was obtained.

Test 2

Figure 6:
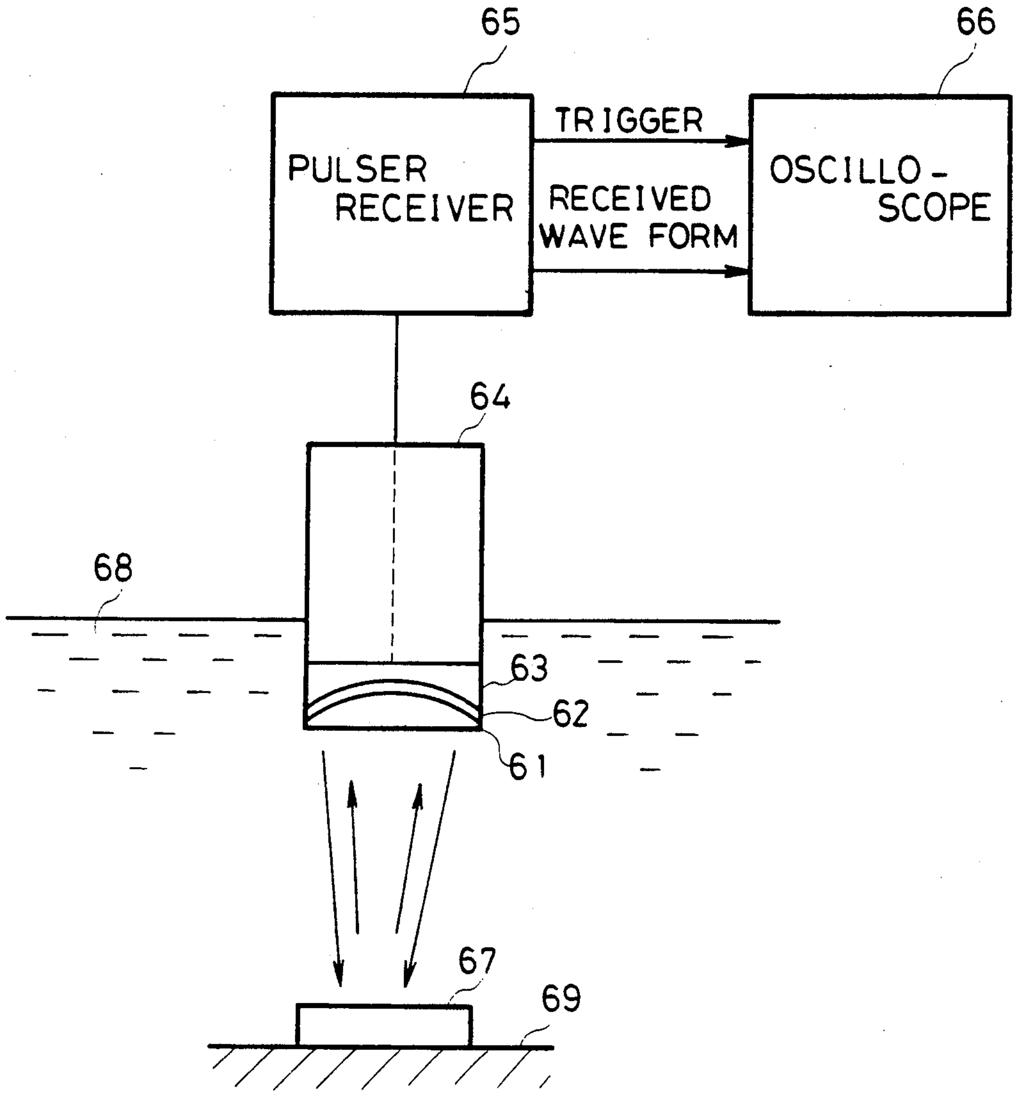
FIG. 6 is a chart to show the test method for transmitted/received wave characteristics.

FIG. 6 shows a test method to determine transmitted/received wave characteristics.

Using the device of the first embodiment and a comparative device of the same structure formed on dense PZT and having an identical resonant frequency in the thickness direction as piezoelectric transducer 61, backing layers 62 were formed on the convex surfaces of the devices 61. Each of the backing layers 62 was adhered with silicone rubber 63 to one end of a plastic cylinder 64 to be used as a probe for measuring transmitted/received waves. The probe was connected to a pulser/receiver 65 and the received output of the pulser/receiver 65 was connected to an oscilloscope 66.

A stainless steel target 67 was immersed in silicone oil 68 and was used. An acoustic absorption board 69 was placed on the back surface of the target 67.

A tip end of the probe (on the side of the device 61) was immersed in silicone oil 68, and the device was driven by applying pulses of the same phase from the pulser/receiver 65 on the electrodes A, B, C and D of the device 61 to generate acoustic waves within the silicone oil 68. The waves reflected from the target 67 was received by the pulser/receiver 65 and processed timewise. The waveforms thereof were observed by the oscilloscope 66.

Figure 7A:
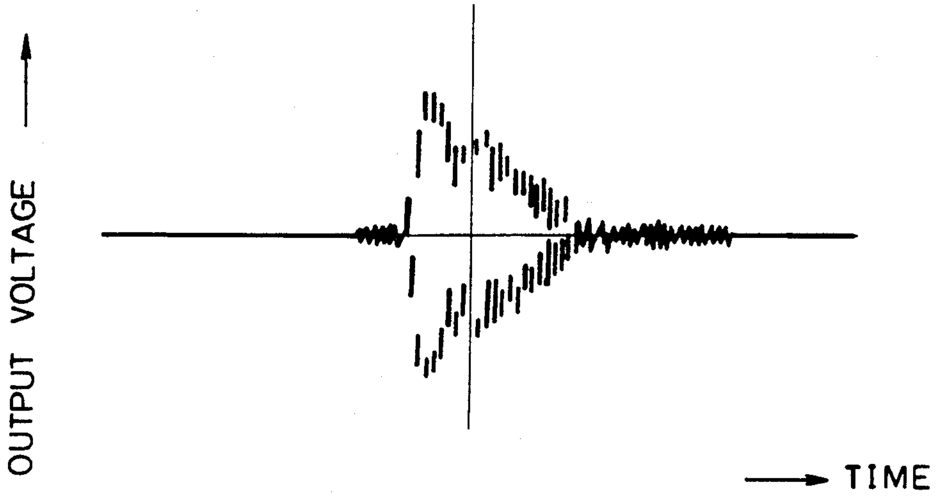
FIG. 7A and 7B show graphs of received waveforms.
Figure 7B:
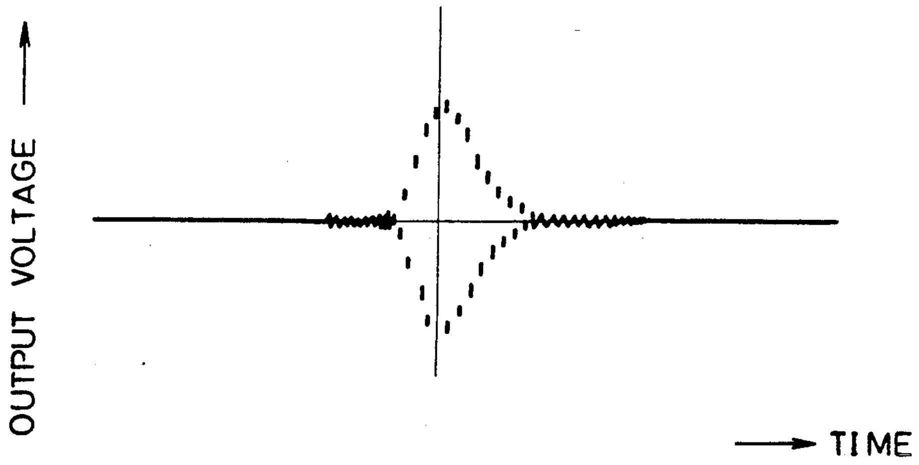

FIG. 7 shows received waveforms. FIG. 7*a* shows the waveforms obtained from the comparative sample while FIG. 7*b* shows the waveforms obtained from the device of the first embodiment of this invention.

The waveforms of vibration uniformly attenuated in the device using a porous material for the piezoelectric base. The time required for damping the amplitude from the maximum to 20 dB or less at the same measurement level was 40% of the comparative sample in the embodiment. (In other words, the difference in time was 60% or more.)

The above test used a piezoelectric base having 50% porosity. When the porosity was decreased to 30%, the difference in time required for attenuation decreased to 20%. When it was decreased further, the time difference further decreased to 20% or less. On the other hand, when the porosity increased, the difference increased. When a material of porosity of 65% was used, the time required to damp the amplitude from the maximum to 20 dB or less became 30% or less of the time needed by the dense material.

When the device of the second embodiment was used, the attenuation time of the received waves was 50% shorter than the device using dense material.

The attenuation time reduction in counterproportion to the increase of porosity is attributable to the fact that as the material of the piezoelectric base had a smaller mechanical quality factor $Q_m$, the vibration waveforms attenuated quality.

Typical piezoelectric factors are shown in the table for dense and porous PZTs.

As shown in the table, the mechanical quality factor $Q_m$ is 140 in the dense PZT, but is 30 in the PZT having a porosity of 30%, thus proving effective in attenuation time in the test. When porosity is 50%, the value $Q_m$ is 11, and when the porosity is 65%, it becomes 5. The value $Q_m$ decreases in counterproportion to the increase of porosity.

According to the table, the electromechanical coupling factor $K_p$ in the spreading vibration mode of a disc was 0.51 in a dense material while it was 0.27 in PZT having 30% porosity which showed in the test the effect of time attenuation for interelectrode signals in latitude. When the porosity was 50%, it was 0.12 and at 65%, it became 0.05 or less. As the porosity increased, the factor decreased.

It was proven that the electromechanical coupling factor $K_p$ is preferably 0.3 or less and the mechanical quality factor $Q_m$ is 30 or less in order to decrease the effect of vibration between electrodes to quickly damp waveforms of received acoustic waves.

As shown in the table, the acoustic impedance in PZT was $28 \times 10^6$ kg/m$^2$ sec in a dense material, but it was smaller in porous material. The value was closer to that of water and of the human body. Therefore the damping of acoustic waves caused by mismatching of acoustic impedance can be avoided.

The above statement demonstrated the effect of the use of PZT, a typical piezoelectric material, as the material for the piezoelectric base and of making the porosity thereof to 30% or higher. This invention can be realized similarly even when other piezoelectric materials such as barium titanate, lead titanate, a compound of lead zirconate titanate group or a mixture thereof is used if the material is given a suitable porosity, the electromechanical coupling factor $K_p$ is set at 0.3 or less, and the mechanical quality factor $Q_m$ of 30 or less. Further, polyvinylidene fluoride or a copolymer thereof having a smaller mechanical quality factor $Q_m$ may be used.

Test 3

Figure 8:
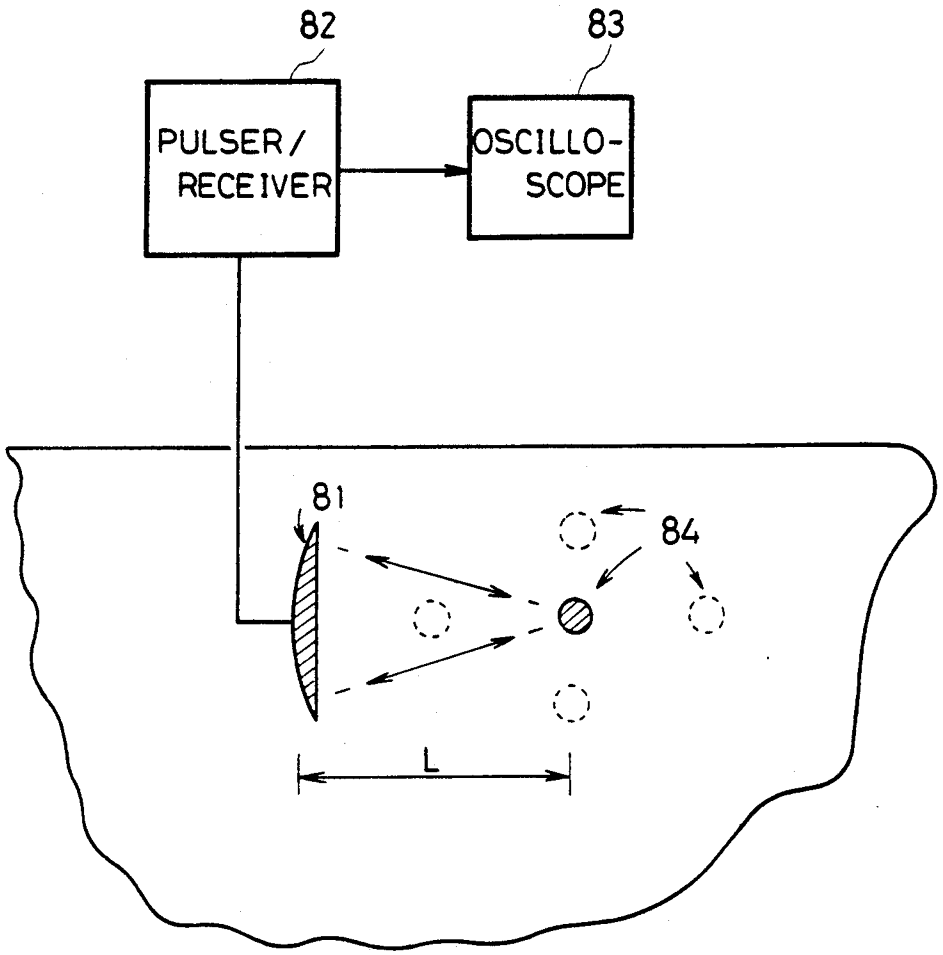
FIG. 8 is a chart to show the measurement method for acoustic wave convergence.

FIG. 8 shows a measurement method for convergence of acoustic waves. The test used a piezoelectric transducer 81, obtained as the first embodiment and immersed in silicone oil. Electrodes on the convex surface thereof were simultaneously driven using the same waveforms by electric pulse signals from a pulser/-receiver 82 to generate acoustic waves on the concave surface thereof in parallel to the liquid level of the oil. A steel ball 84 of 5 mm diameter was supported with a fine wire, and moved within the oil, and the acoustic waves reflected from the steel ball 84 were received by the pulser/receiver 82. The waveforms thereof were displayed at an oscilloscope 83.

As a result, it was found that when the steel ball 84 was positioned at a position close to the spherical center or about 80 mm apart from the center of the concave surface, echoed waves became the strongest. It was confirmed that when a piezoelectric transducer of spherical form was used, acoustic waves were converged at the spherical center thereof.

Figure 9:
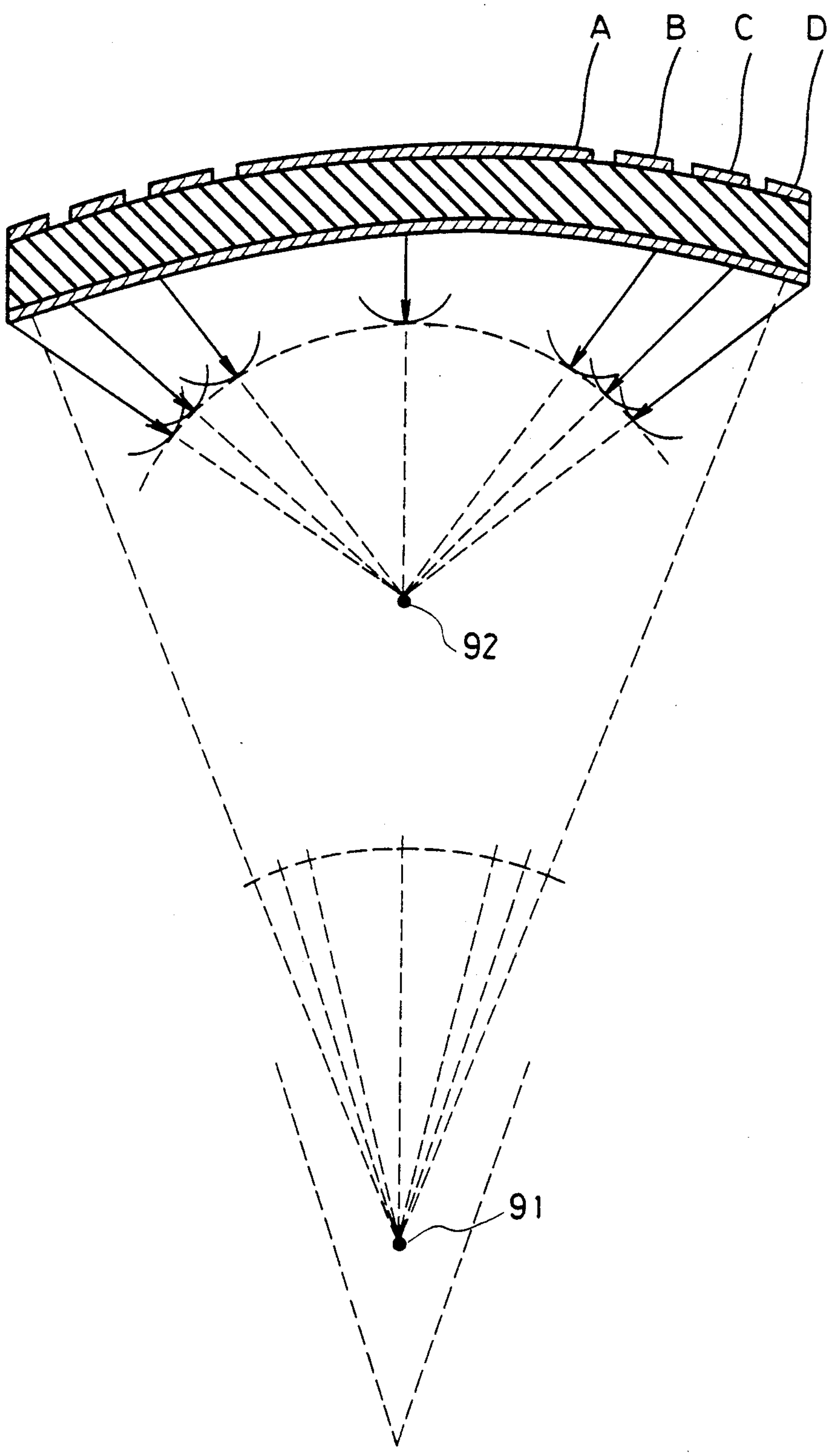
FIG. 9 shows the control of convergent points to which acoustic waves focus.

FIG. 9 shows control of the convergent points at which acoustic waves focus. The piezoelectric transducer having a spherical form shown in the above embodiments acts as an acoustic lens having the sound fields focused by the concave surface thereof. For instance, when electric voltages of the same phase were applied on respective piezoelectric transducer elements, the focus of the generated acoustic waves agrees with the spherical center. When the phases of the voltages for driving respective elements are chronologically staggered, the convergent points can be controlled while moving.

More particularly, by controlling the phases of pulsed voltages for driving the piezoelectric transducer elements, pulsed voltages were applied in phases staggered from the outermost element toward the inside. Acoustic fields then focus at the geometric focus of the curved surface of a point 92 which is closer to the device than the spherical center 91. When the voltages are applied in phases staggered from the center electrode toward the outside, the acoustic fields focus at a point 93 farther than the spherical center 91. The positions at points 92, 93 can be arbitrarily controlled by staggering the phases of the pulsed voltages.

When piezoelectric transducer elements are driven staggered timewise, if the driving waveform of an element affects an adjacent element, the phase control would be disturbed to deteriorate convergence of acoustic fields. However, in the case of this invention, as the material used has a small electromechanical coupling factor $K_p$ in the spreading vibration mode, noises and reverberations cased by unnecessary lateral vibrations can be reduced.

Although only a few embodiments have been described in detail above, those having ordinary skill in the art will certainly understand that many modifications are possible in the preferred embodiment without departing from the teachings thereof.

All such modifications are intended to be encompassed within the following claims.

TABLE

| | | | Dense material | Porous material | | | |
|---|---|---|---|---|---|---|---|
| | | | | Porosity 30% | Porosity 40% | Porosity 50% | Porosity 65% |
| Relative dielectric constant | | $\epsilon_s$ | 1470 | 540 | 420 | 260 | 160 |
| Electromechanical coupling factor in spreading vibration mode | | $K_p$ | 0.51 | 0.27 | 0.17 | 0.12 | 0.05 or less |
| Piezo-electric constant in thickness direction | piezoelectric distortion constant | d $[10^{-12}$ C/N] | 196 | 130 | 169 | 174 | 290 |
| | voltage output factor | g $[10^{-3}$ Vm/N] | 15 | 27 | 45 | 75 | 300 |
| Mechanical quality factor | | $Q_m$ | 140 | 30 | 23 | 11 | 5 or less |
| Acoustic impedance | | $[10^6$ kg/m$^2$ sec] | 28 | 13 | 10 | 8 | 5 or less |

What is claimed is:

1. A piezoelectric transducer comprising:

a single material piezoelectric base molded as a curved plate, wherein an entire4ty of said piezoelectric base is formed of a material having an electromechanical coupling factor $K_p \leqq 0.3$ for vibration diffusing in a planar direction;

a first electrode formed on one surface of said piezoelectric base and in contact with said material having an electromechanical coupling factor $K_p \leqq 0.3$, and second electrodes formed on an other surface of said piezoelectric base in contact with said material having an electromechanical coupling factor $K_p 0.3$, said second electrodes being divided concentrically in such a way that divided sections are insulated from one another, wherein no otehr materials than said material with said electromechanical coupling factor $K_p \leqq 0.3$ are between said first and second electrodes.

2. The piezoelectric transducer as claimed in claim 1 wherein said material of said piezoelectric base is also has a mechanical quality factor $Q_m \leqq 30$ or less.

3. The piezoelectric transducer as in claim 2 wherein the piezoelectric base includes lead zirconate titanate of porosity of 30.

4. The piezoelectric transducer as in claim 1 wherein the piezoelectric base includes lead zirconate titanate of porosity of at least 30.

5. The piezoelectric transducer as in claim 1 wherein said curved plate of said piezoelectric base is spherical.

6. The piezoelectric transducer as in claim 1 wherein said second electrodes include plural concentric annular electrodes and said first electrode is formed substantially across one of the surfaces of the piezoelectric base.

7. The piezoelectric transducer as claimed in claim 1 wherein said divided sections have respective areas such that electrocapacities between the first and second electrodes which are opposed to each other across the piezoelectric base are substantially identical to each other.

8. The piezoelectric transducer as in claim 1 further comprising a resin coating, covering surfaces and end faces of the transducer.

9. The piezoelectric transducer as claimed in claim 1 wherein there is one first electrode which is used commonly for the piezoelectric base.

10. The piezoelectric transducer as claimed in claim 9 wherein each of the plural piezoelectric transducer elements have substantially equal electrostatic capacities between the first and the second electrodes.

11. The piezoelectric transducer as claimed in claim 10 further comprising a resin coating on the surfaces of said piezoelectric transducer.

12. A transducer as in claim 1, wherein each of said concentrically divided sections form unbroken sections of a circle.

13. A piezoelectric transducer comprising:

a single material piezoelectric base formed entirely of a porous material of a porosity of at least 30 vol%;

at least one first electrode formed on one surface of the base and in contact with said porous material;

a plurality of second electrodes formed on an other surface of said base and in contact with said porous material;

wherein said second electrodes are formed to be separated sections which are arranged concentrically and electrically and mechanically insulated from each other and wherein only said porous material, and no other materials, are between said first and second electrodes.

14. The piezoelectric transducer as claimed in claim 13 wherein the piezoelectric base is formed of a material having a mechanical coupling factor $K_p \leqq 0.3$ for vibration fo radial mode vibration.

15. The piezoelectric transducer as claimed in claim 14 wherein said piezoelectric base has a curved surface, the electrodes being arranged along the curved surface.

16. The piezoelectric transducer as claimed in claim 15 wherein the curved surface is a spherical surface.

17. The piezoelectric transducer as claimed in claim 10 wherein said material also has a mechanical quality factor $Q_m$ of $\leqq 30$.

18. The piezoelectric transducer as claimed in claim 17 wherein said material is porous PZT.

19. The piezoelectric transducer as claimed in claim 13 wherein said material is porous PZT.

20. A transducer as in claim 13, wherein each of said concentrically divided sections form unbroken sections of a circle.

* * * * *